United States Patent [19]

Stiff et al.

[11] Patent Number: 4,677,813
[45] Date of Patent: Jul. 7, 1987

[54] CANE HARVESTER

[75] Inventors: Rodney A. Stiff; Malcolm J. Baker; Leslie J. Lester, all of Bundaberg, Australia

[73] Assignee: Austoft Industries Limited, Canada

[21] Appl. No.: 756,277

[22] Filed: Jul. 18, 1985

Related U.S. Application Data

[62] Division of Ser. No. 423,262, Sep. 24, 1982, Pat. No. 4,555,896.

[30] Foreign Application Priority Data

Nov. 20, 1981 [AU] Australia ............... PF1633

[51] Int. Cl.$^4$ .......................................... A01D 34/03
[52] U.S. Cl. .......................................... 56/13.9
[58] Field of Search ...................... 56/13.9, 14.5, 16.5, 56/14.4

[56] References Cited

U.S. PATENT DOCUMENTS 3,377,785  4/1968  Kessler ...................... 56/1
3,397,520  8/1968  Johnston et al. ............ 56/1
3,599,404  8/1971  Fernandez et al. ........... 56/12.8
4,121,778 10/1978  Quick ........................ 56/16.5
4,212,142  7/1980  Miner ........................ 56/14.4
4,295,325 10/1981  Cannavan .................... 56/13.9
4,322,940  4/1982  White ........................ 56/328 R Primary Examiner—Robert Peshock
Attorney, Agent, or Firm—John R. Uren

[57] ABSTRACT

A sugar cane harvester is disclosed in which chopped crop is conveyed from a chopping mechanism to a cleaning mechanism. The cleaning mechanism includes an extractor fan positioned in an upper portion of a cleaning cylinder and a substantially unobstructed air intake surrounding the periphery of the cleaning cylinder. The air intake draws air in a generally downward direction through the air intake and into the cleaning cylinder, and upwardly through a substantial portion of the crop after the crop exits from the chopping mechanism. Debris is expelled upwardly through the extractor fan, while cleaned crop drops into an elevator for transportation away from the cleaning mechanism. A energy absorbing plate is mounted in the cleaning area to contact crop billets as the billets leave the chopping mechanism. The plate is adjustably mounted to contact greater or lesser amounts of the crop after the crop passes through the chopping means.

5 Claims, 7 Drawing Figures

CANE HARVESTER

This is a division of application Ser. No. 423,262 filed Sept. 24, 1982 now U.S. Pat. No. 4,555,896 issued 12/03/85.

INTRODUCTION

This invention relates to sugar cane harvesters and, in particular, to an improved cleaning and conveying system used on sugar cane harvesters.

BACKGROUND OF THE INVENTION

Sugar cane growing uses mechanization techniques extensively and these techniques have resulted in sugar cane harvesters being used which are satisfactory for the crop conditions under which they are used. Present harvesters, however, with few exceptions, are adapted to cut burned cane. This is crop which has had the trash cover burned prior to cutting and which, therefore, reduces by a large portion the percentage of chaff or trash to cane which enters the harvester.

As opposed to this practice, "green cane cutting" has become a favoured method in some circumstances. Green cane cutting is desirable since burning requires additional labour and is dangerous. Further, green cane cutting allows harvesting flexibility during wet weather.

Nevertheless, the art of mechanically cutting green cane is in its infancy and the problems associated with its cutting have not been fully investigated. Bearing this in mind, it should be understood that the explanations herein are believed to be correct but that they may nevertheless prove to be incorrect or qualified in the years to come as further knowledge of green cane harvesting becomes available.

In harvesters used for cane harvesting, the cleaning assembly is the area of primary concern. Uniform air distribution throughout the cleaning system is desirable since this will more efficiently separate the cane from the chaff or crop trash such as loose leaves and the like. When unburned crop is being harvested, the cleaning system is under additional labor to adequately separate the crop from the chaff for milling purposes. While various cleaning systems have been used for green cane harvesting, there are disadvantages inherent in all.

For example, some burned cane harvesters have been used for green cane cutting. These harvesters, while satisfactory at low speeds due to the ability of the cleaning system of the harvester to accept relatively low speed loading, are not able to harvest crop at the large capacities which are desirable due to the configuration of the machine, the inefficiency of the cleaning system and the general ability of the machine to accept heavy loading.

Harvesters used for green cane harvesting may suffer various other disadvantages. For example, a harvester may be adapted for one-row cutting only. One-row cutting is not desirable because the harvester must travel between rows which is inefficient. This particular disadvantage is caused by the configuration of the cleaning and conveying system which is required, in part, by the cleaning requirements of green cane harvesting.

A further problem relates to present drive systems which are used for driving the chopper rollers in harvesters. Chopper rolls may jam if the soil is rocky or debris laden. At the same time, the chopper rolls have relatively little inertia by themselves and, therefore, without some additional inertia compensation, they cannot adequately cut the billets when the crop mat suddenly increases. To overcome this problem, a flywheel is ordinarily connected to the chopper rolls. In one design, the flywheel, through reduction gears, drives the chopper rolls, the flywheel being driven by the source of harvester power. In the event the chopper rolls jam however, the large inertia of the flywheel is transmitted to the chopper rolls and since the reduction gears further amplify the inertia force of the flywheel, damage to the chopper rolls can result. To prevent this damage, unnecessarily elaborate release mechanisms have been designed.

Similarly, it is also desirable to provide a reversal to the chopper rolls in the event of jamming so as to attempt to free the rolls. Methods used to accomplish this with flywheel driven chopper rolls, however, have been unsatisfactory, again because they are over-elaborate and do not provide full operating power in the reverse direction.

Yet a further problem relates to a desire to achieve uniform crop distribution in the cleaning area of a sugar cane harvester. Uniform crop distribution is difficult to achieve because of the various varieties of sugar cane and the crop conditions under which cane is harvested. Further, the speed of the chopper rolls may usually be changed to increase or decrease the billet length of the cane which also affects crop distribution in the cleaning area.

Yet still a further problem relates to the conveyancing of the cut crop from the base cutter to the chopper rolls. The crop mat which is being conveyed should be substantially uniform across the width of the conveying passage. The feed rolls, used for conveying the crop, should provide a uniform conveying speed to the crop mat and a uniform pressure on the crop. Hydraulic flow dividers have been used for the feed rolls. These are inefficient and reduce power.

SUMMARY OF THE INVENTION

According to one aspect of the present invention, there is disclosed a sugar cane harvester comprising feed means, cutting means to sever the cane after it has entered said feed means, conveying rollers to convey the cane to a chopping means following the severing of said cane by said cutting means, said chopping means cutting said cane after said cane has been conveyed to said cutting means by said conveying rollers, and cleaning means to clean said crop, said cleaning means comprising a cleaning cylinder, an extractor fan positioned in the upper portion of said cleaning cylinder, air intake means surrounding a substantial portion of the periphery of said cleaning cylinder, and conveying means for receiving and conveying cut cane from said cleaning means, said conveying means being rotatable about an axis and said receiving area of said conveying means being located substantially directly below said extractor fan.

According to a further aspect of the invention, there is disclosed a drive system for chopper rolls in a sugar cane harvester, said drive section comprising a plurality of rotatable chopper rolls, blades on each of said chopper rolls, a reversible hydraulic motor used to drive each of said chopper rolls, first gear means interconnecting said chopper rolls, a flywheel, second gear means interconnecting said chopper rolls and said flywheel and adjustable flywheel release means between said flywheel and said second gear means.

According to yet a further aspect of the invention, there is disclosed a sugar cane harvester comprising chopping means to chop the cane crop into billets, a cleaning chamber to separate the chaff in said crop from said billets after said crop passes through said chopping means, an energy absorbing plate mounted in said cleaning chamber to contact said billets after said billets leave said chopping means, said plate being adjustably mounted to contact a greater or lesser amount of crop after said crop passes through said chopping means into said cleaning chamber.

According to yet a further aspect of the invention, there is disclosed a hydraulic drive system for conveying crop, said drive system comprising a source of hydraulic fluid, a hydraulic pump to convey said fluid from said source to a plurality of hydraulic motors, a plurality of feed rolls powered by said hydraulic motors and located substantially in pairs on opposed sides of a crop conveying passage, said hydraulic fluid passing through from one of said hydraulic motors on one side of said conveying passage to the opposed feed roll on the opposite side of said passage.

BRIEF DESCRIPTION OF THE SEVERAL VIEWS OF THE DRAWINGS

An embodiment of the invention will now be described, by way of example only, with reference to the accompanying drawings in which.

DESCRIPTION OF SPECIFIC EMBODIMENT

Figure 1:
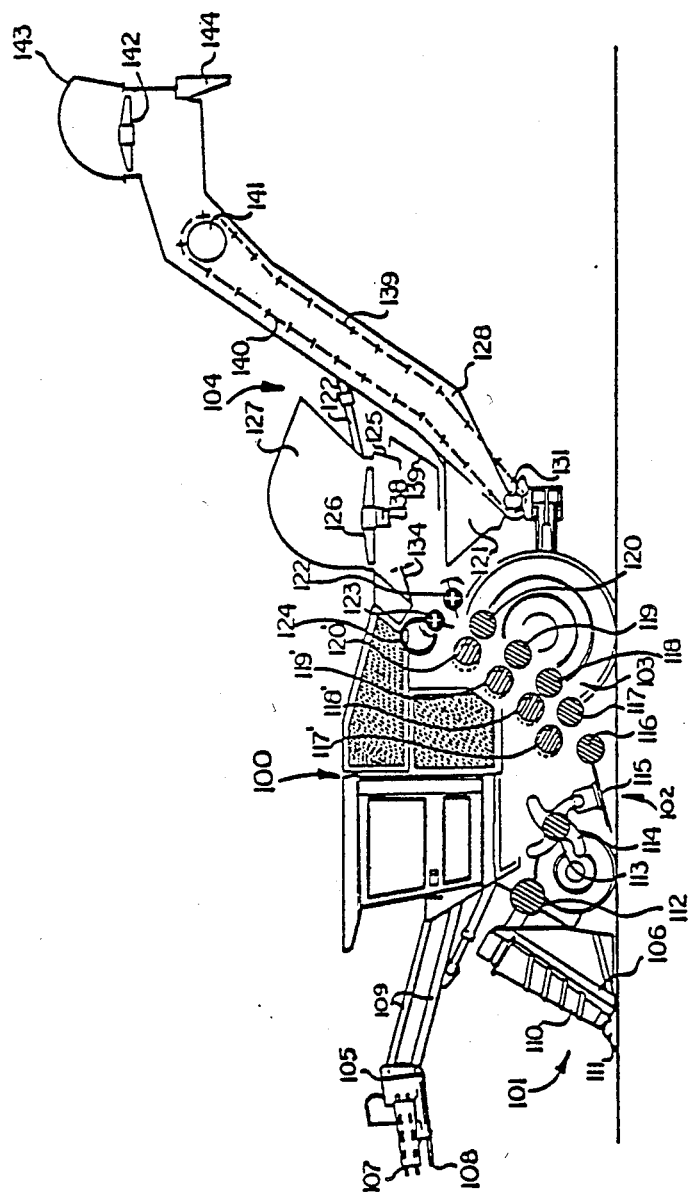
FIG. 1 is a side view of a sugar cane harvester according to the invention.

Referring now to the drawings, a sugar cane harvester is shown generally at 100 in FIG. 1. It comprises four general mechanisms, namely the gathering area 101, cutting area 102, feeding area 103, and the cleaning and conveying area 104.

The gathering area 101 includes topper 105 and crop dividers 106. Topper 105 comprises gathering discs 107 (see also FIG. 3) and cutting discs 108. The gathering discs 107 and cutting discs 108 are hydraulically driven and fully reversible. The topper 105 is height adjustable by way of a pair of arms 109 which can be hydraulically raised or lowered as desired by the operator.

Crop dividers 106 include two spiral feed rollers 110, each with a respective ground shoe 111 at its lower portion.

Rotatable "knock-down" rollers 112, 113 are present in the crop passage area. Fins 114 are intermittently mounted to knock-down roller 113 across its width to separate the cane stalks as they are knocked down by roller 113.

The cutting area 102 comprises basecutters 115 which rotate and which have blades (not shown) mounted on their periphery which sever the base of the cane as it passes into the crop passage or feeding area 103 of the harvester. Butt roller 116 separates rocks and dirt from the crop mat after it passes from the basecutters 115. The feeding area 103 comprises feed rollers 117, 118, 119, 120, each roller being paired with its opposed pinch roller 117', 118', 119', 120', respectively and each feed roller being hydraulically powered. The pinch rollers 117', 118', 119', 120' can move inwardly and away from the crop mat depending on the width of the mat being conveyed from the cutting area 102 through the feeding area 103. At the end of the feed roller train, two hydraulically driven chopper rolls 122, 123 are located which sever the crop mat at desired intervals as they rotate. The chopper rolls 122, 123 are attached to a flywheel 124 which allows a greater crop concentration to be cut. The chopper rolls 122, 123 and the flywheel 124 connected thereto will be explained in greater detail hereafter.

Figure 2:
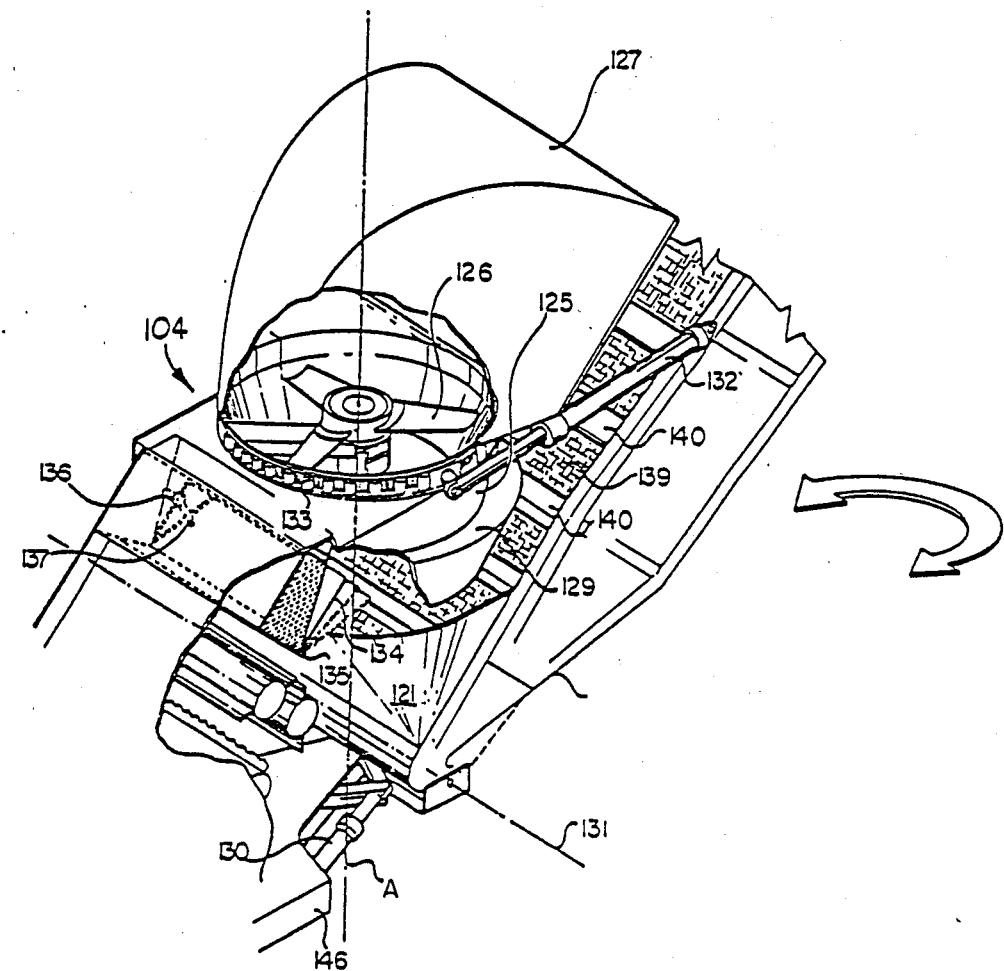
FIG. 2 is an enlarged cutaway view of the cleaning and conveying system of the harvester of FIG. 1.
Figure 3:
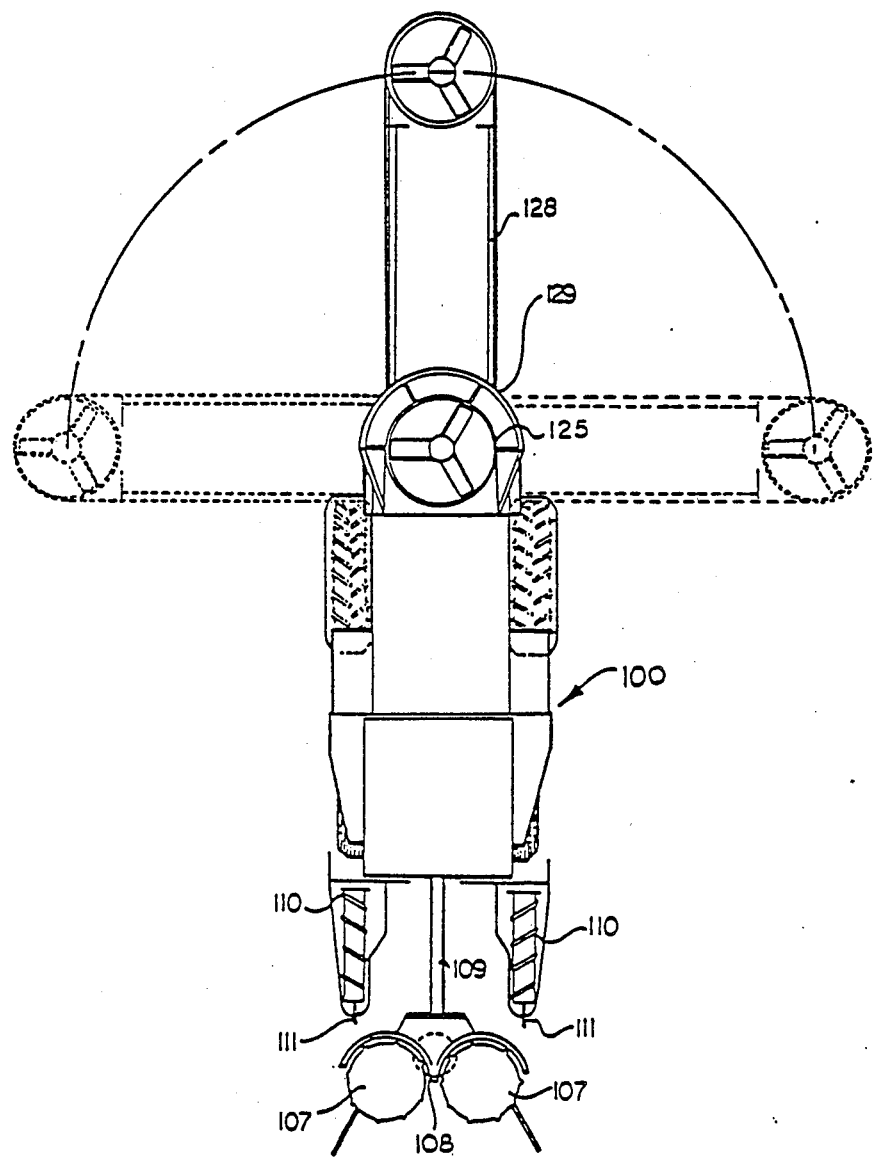
FIG. 3 is a cutaway plan view of the harvester showing the conveying system and the rotation of the conveying system.

The cleaning and conveying area 104 (shown more clearly in FIG. 2) comprises the cleaning chamber 125, extractor fan 126, discharge hood 127 and elevator 128. Cleaning chamber 125 is substantially cylindrical and a large air intake area 129 extends outwardly from the cleaning chamber 125 and extends about a substantial portion of its periphery as also shown in FIG. 3.

The elevator 128 rotates about vertical axis A which passes substantially through the axis of the extractor fan 126. The elevator 128 is rotated in the direction of the arrows (FIG. 2) by the use of twin hydraulic cylinders 130 (only one of which is shown) as desired by the operator. The elevator 128 is supported and moved vertically about horizontal axis 131 by hydraulic cylinders 132 (only one of which is shown). Hydraulic cylinders 132 are each mounted to chain 133 which has a track about the base of discharge hood 127.

An energy absorbing plate 134 is positioned on the inside of cleaning chamber 125. The plate 134 is adjustable about a hinge 135 by means of a fastener 136 which extends through an arcuate opening 137 in the cleaning chamber 125 and is fastened at any position on the opening. It may also be controlled from the operator's console if desired.

The extractor fan 126 is mounted in the upper portion of the cleaning chamber 125 and is powered by hydraulic motor 138. It creates a draft by utilising the air sucked into the machine through the air intake area 129 and discharges the air and crop chaff through discharge hood 127. Discharge hood 127 is rotatable relative to cleaning chamber 125 so that the chaff may be discharged in a desired direction.

Located directly below the cleaning chamber 125 and extractor fan 126 is the receiving area 121 of the elevator 128. The receiving area 121 communicates directly with the intake of elevator 128. Elevator 128 also includes elevator chain 139 and flights 140 which rotate about lower and upper axes 131, 141. A second extractor fan 142 in extractor hood 143 creates a draft to remove additional chaff from the cane crop. Deflector plate 144 is mounted on the end of elevator 128 to deflect the billets into a transporter (not shown).

Figure 7:
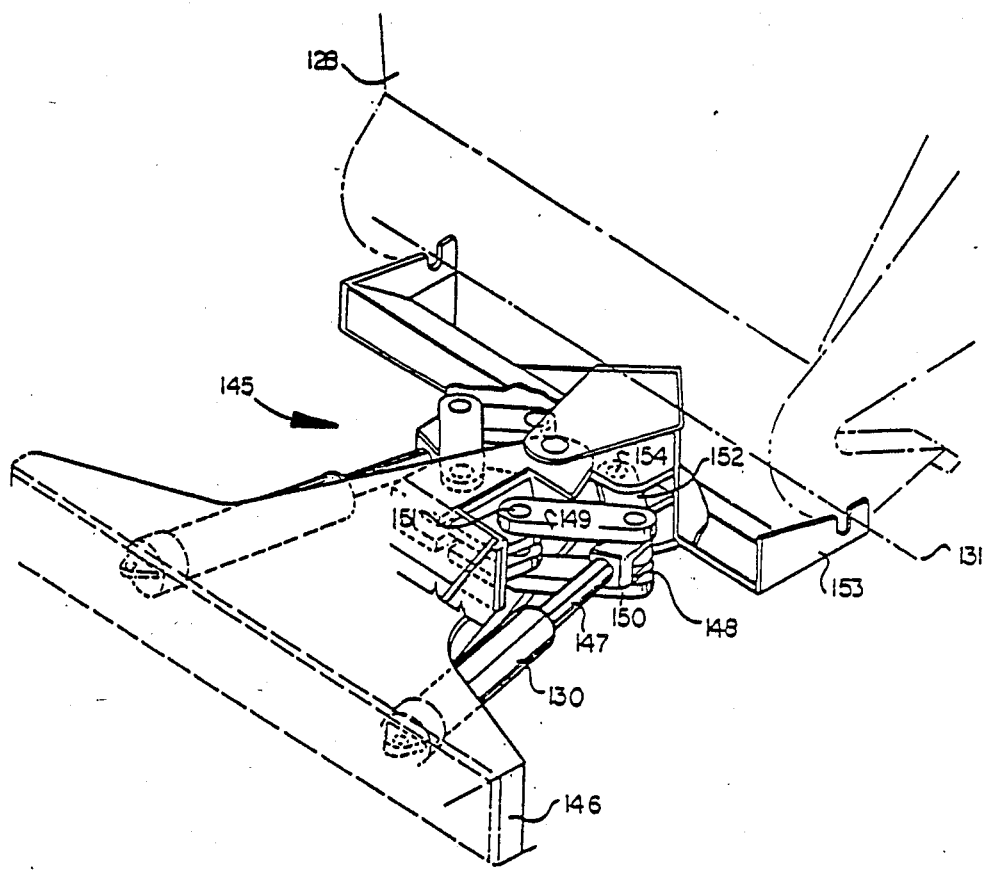
FIG. 7 is a view of the elevator rotating mechanism.

The mechanisms used for rotation of the elevator 128 between the two sides of the harvester 100 are shown in more detail in FIG. 7.

An elevator slew mechanism shown generally at 145 is used to rotate elevator 128 about vertical axis A. Two two-arm parallel linkages are used on each side of axis A. Since the mechanism is symmetrical about axis A, only one side will be described.

Hydraulic cylinder 130 extends from frame 146 and piston 147 extends from cylinder 130 with clevis 148 mounted thereon. Clevis 148 fits between one end of the two link arms 149, 150 which are pivotably mounted to frame 146 by pin 151. A further link pair 152 is mounted to clevis 148 and extend to bracket 153 where the links are pivotably mounted by pin 154.

Elevator 128 is secured in bracket 153 by pins (not shown) and may rotate upwardly and downwardly about the pins on horizontal axis 131 by extending or retracting hydraulic cylinders 132 (only one of which is shown).

Figure 4:
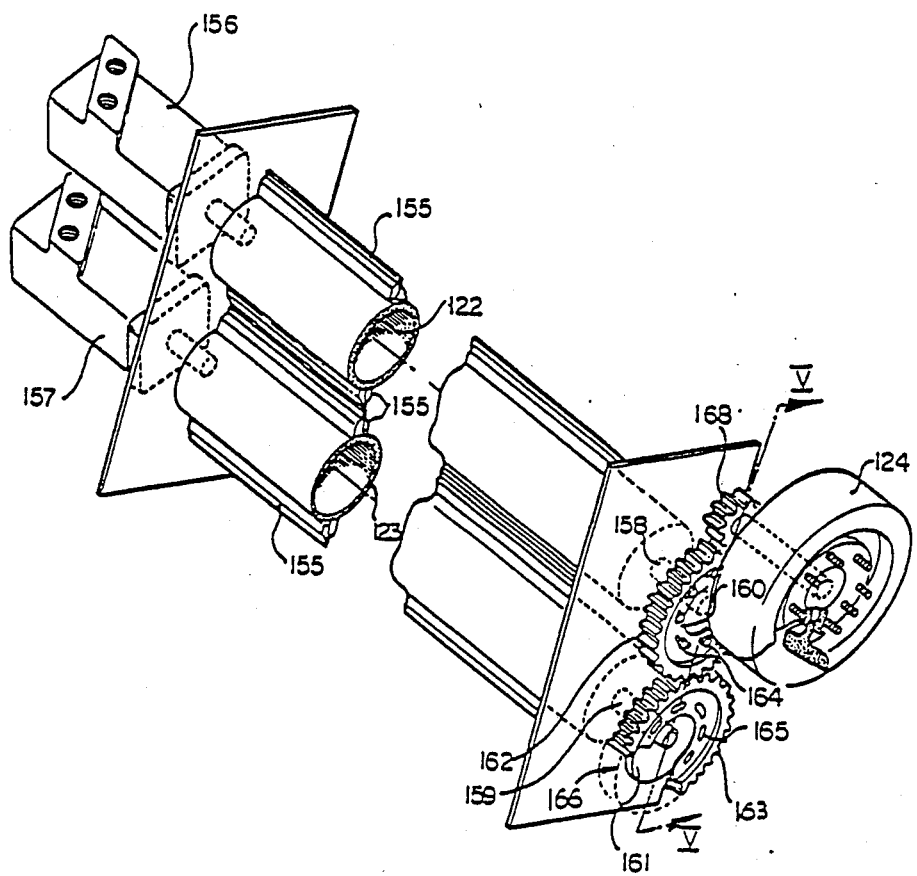
FIG. 4 is an enlarged view of the drive system for the chopper rolls.
Figure 5:
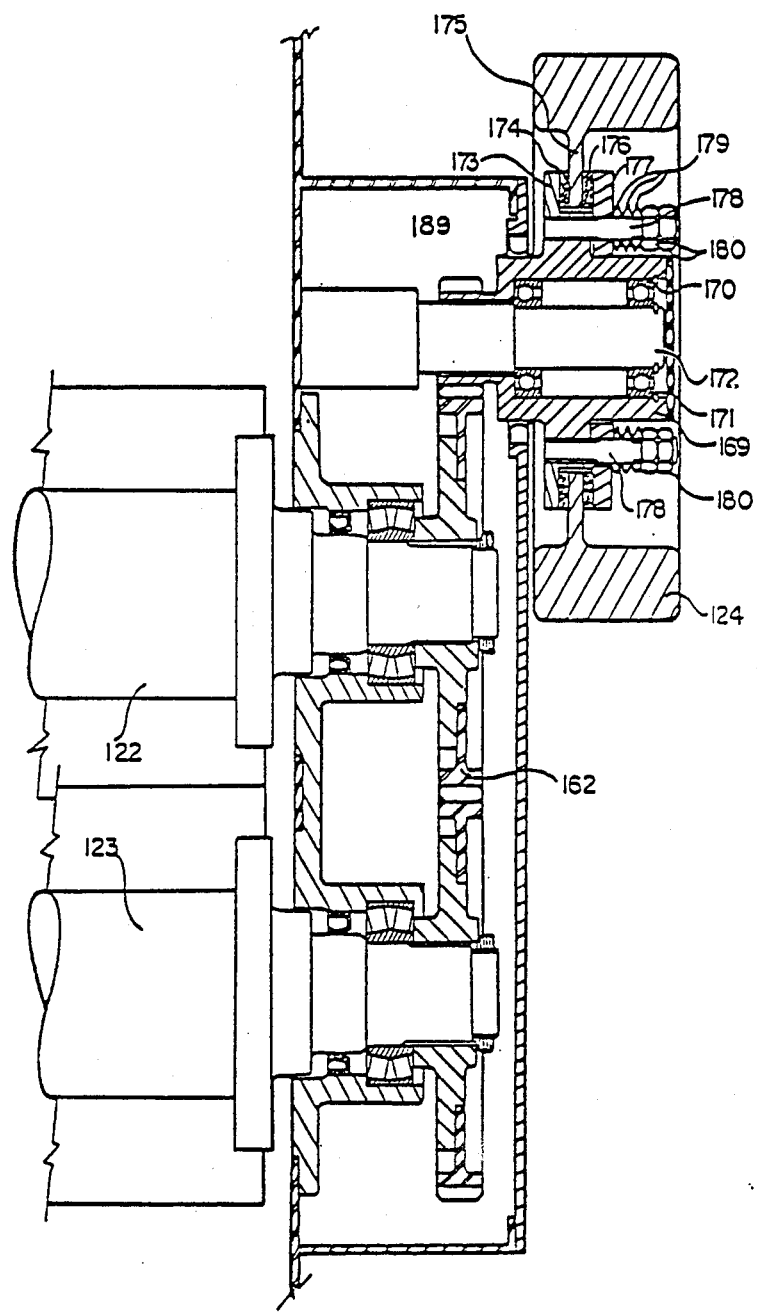
FIG. 5 is a sectional view of the timing and release mechanisms of the drive system chopper rolls taken along the line 5—5 of FIG. 4.
Figure 6:
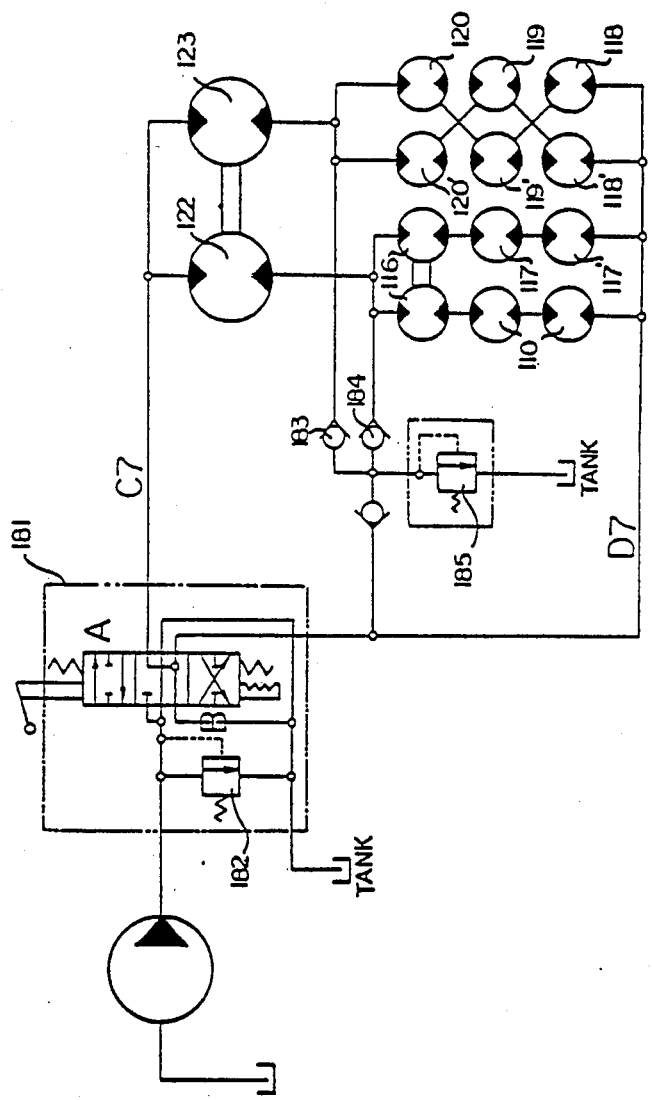
FIG. 6 is a schematic of the hydraulic circuit used to power the drive system.

The drive system, the timing and release mechanisms and the hydraulics used for powering the feed system are shown in more detail in FIGS. 4-6.

FIG. 4 depicts the drive system of the chopper rolls 122, 123. Blades 155 are attached to the periphery of the chopper rolls 122, 123 which are driven by hydraulic motors 156, 157.

Shafts 158, 159 extend from the opposed ends of chopper rolls 122, 123 and hubs 160, 161 are mounted on shafts 158, 159. Ring gears 162, 163 are mounted on hubs 160, 161 and are attached thereto by bolts 164 (not all of which are shown) extending through arcuate shaped openings 165 on the ring gears 162, 163. The combination of the ring gear 163, the hub 161 the bolts 164 and the arcuate openings 165 act as an adjustment device shown generally at 166 since the hub 161 may be rotated relative to ring gear 163 by loosening the bolts extending through the arcuate openings. When the proper relationship between ring gears 162, 163 is achieved as is necessary, for example, when the gears become worn, the bolts are tightened securely. Thus, the chopper rolls 122, 123 are mechanically joined by meshing ring gears 162, 163.

A pinion 168 meshes with ring gear 162 and it, in turn, drives flywheel 124. A release mechanism is used to release the flywheel from the ring gears 162, 163, and pinion 168.

Referring to FIG. 5, ring gear 162 meshes with pinion 168 which is integral with hub 169. Hub 169 rotates on bearings 170, 171 mounted on shaft 172. Hub 169 has an outwardly extending circumferential protuberence 173 with a groove machined in its periphery. A first friction disc 174 is mounted in the groove. Flywheel 124 is positioned with its running disc 175 mounted between friction disc 174 and second friction disc 176. A keeper ring 177 is mounted against second friction disc 176. Bolts 178 extend from protuberance 173 through keeper ring 177 and a plurality of Belleville washers 179 are positioned over bolts 178 and are secured with nuts 180. Accordingly, the pressure exerted on the running disc 175 of flywheel 124 by the friction discs 174, 176 can be increased or decreased as desired by tightening or loosening nuts 180.

Referring now to FIG. 6, the hydraulic circuit used to power the butt roller 116, the spiral feed rollers 110, and the feed and pinch rollers 117, 117', 118, 118', 119, 119', 120, 120' and the chopper rolls 122, 123 is depicted in schematic form. It will be understood that each of the rollers referred to is the functioning operative of its respective hydraulic motor where the fluid flow actually occurs.

A control valve 181 has three positions. In the first position, as depicted in FIG. 6, hydraulic fluid flows through valve 181 and back to the tank. In this position, no fluid passes to the hydraulic motors. In the second position, wherein portion A of control valve 181 is operable, such as when the harvester is under normal operation, fluid flows through valve 181 via line C in parallel through chopper rolls 122, 123 and, thence, from one line from chopper roll 122 to butt roller 116 where, it will be noted, there is double power exerted because of the parallel fluid source. Chopper feed rolls 122, 123 and butt rolls 116 are mechanically connected as depicted. Hydraulic fluid also passes in series through pinch roller 120', feed roller 119, pinch roller 118', and through feed roller 120, pinch roller 119' and feed roller 118 alternatively, as depicted, such that the mat between the rollers is subject to alternate pressures by the various rollers throughout the crop conveying passage. The fluid also passes through and powers spiral feed rollers 110, power feed roller 117, and pinch roller 117' in series as depicted.

In the third position, wherein portion B of control valve 181 is operable, the hydraulic fluid flow is reversed. In this position, fluid flows first to the various feed and pinch rollers through line D, thence to the chopper rolls 122, 123 and thereafter to the tank.

In the event the chopper rolls 122, 123 become jammed in the normal operating mode, relief valve 182 opens and allows the fluid to return to the tank.

In the event any of the feed or pinch rolls become jammed in the normal operating mode, fluid may flow through check valves 183, 184 and back into the tank through relief valve 185.

In the event any of the feed or pinch rollers become jammed in the reversible mode (i.e., with the control valve 181 in position B), fluid may flow back to the tank through the appropriate check valve to protect the jammed motors.

OPERATION

In operation, after the cane harvester 100 is transported to the desired area, the operator moves the machine along the row of cane. The gathering discs 107 gather the cane tops and sever and dispose of them on either side of the harvester 100. The ground shoes 111 set the operating width which determines the quantity of cane entering the throat of the harvester 100 and the spiral feed rollers 110 gather the crop into the throat where the knock-down roller 112 bends the stalks of the cane in conjunction with the action of knock-down roller 113. The basecutters 115 sever the cane and the butt roller 116 feeds the severed cane into the feeding area 103. The crop mat passes through the feed and pinch rollers 117, 117', 118, 118', 119, 119', 120, 120' respectively, where the mat is compressed and made more uniform and the rocks and debris are shaken free. The crop then passes to the chopper rolls 122, 123 where it is severed into billet length sections. The crop then passes to the cleaning and conveying area 104 where the cane billets fall downwardly from the cleaning chamber 125 into the receiving area 121 and thence to elevator 128.

As the crop leaves the chopper rolls 122, 123 it may be deflected by energy absorbing plate 134 if it is desirable to use the plate under the particular crop conditions in order to provide better distribution in the cleaning chamber.

The chaff in the crop, being lighter in weight than the billets, is blown from the discharge hood 127 by extractor fan 126.

The billets which have fallen into the elevator 128 are conveyed to the top of the elevator 128 by flights 140 on elevator chain 139 and are thrown towards deflector plate 144 where they are deflected downwardly into transporters (not shown) for shipment to the milling facility.

Second extractor fan 142 removes additional chaff still remaining in the crop on elevator 128 with the billets and discharges it through extractor hood 143.

After completing one row of harvesting, the operator may desire to make another pass on an adjacent row. In this event, he turns the harvester around, rotates the elevator 128 to the opposite side of the harvester as depicted in FIG. 3 and re-commences the harvesting operation. To rotate the elevator 128, the piston 147 of hydraulic cylinder 130 is extended. This moves link arms 149, 150 counter clockwise about pin 151. Link pair 152 exerts the necessary force on bracket 153 through pin 154 and, therefore, elevator 128 rotates through the desired angle. The two hydraulic cylinders 130 are in the same hydraulic circuit but coupled in a reverse flow position such that when piston 147 is extended, the opposed piston is retracted. Thus, the action of the hydraulic cylinders is complementary.

In the event the chopper rolls 122, 123 become jammed by rocks or other debris, they are fully rotatable in a reverse direction by hydraulic motors 156, 157. Since flywheel 124 contains considerable energy, in the event the chopper rolls 122, 123 become jammed, the energy must be dissipated over some interval to prevent damage. To that end, the release mechanism for the flywheel 124 is adjusted by either tightening or loosening nuts 180. They, in turn, compress or loosen Belleville washers 179 which, acting on keeper ring 177, determine the force between running disc 175 and friction discs 174, 176. This force determines when the flywheel will break loose from hub 169 thereby avoiding damage to the chopper rolls 122, 123.

Because it is necessary that the blades 155 of the chopper rolls 122, 123 pass close together to achieve correct crop cutting, the blades 155 may become too olose when gears 162, 163 begin to wear and interfere. This is compensated by loosening bolts 164 and rotating ring gear 163 relative to hub 161. Bolts 164 are then tightened. Thus, the blades 155 will be prevented from contacting each other and becoming damaged.

There has been described a particular embodiment of the invention in which many modifications may be made which will fall within the scope of the invention. Accordingly, the invention should be construed only by reference to the accompanying claims.

I claim:

1. A sugar cane harvester comprising chopping means to chop the cane crop into billets, a cleaning chamber to separate the chaff in aid crop from said billets after said crop passes through said chopping means, an energy absorbing plate mounted in said cleaning chamber to contact said billets after said billets leave said chopping means, said plate being adjustably mounted to contact a greater or lesser amount of crop after said crop passes through said chopping means into said cleaning chamber.

2. A sugar cane harvester as in claim 1 wherein said plate is mounted so as to deflect said crop downwardly.

3. A sugar cane harvester as in claim 2 wherein said plate is mounted immediately adjacent said chopping means.

4. A sugar cane harvester as in claim 3 wherein said plate is hingedly mounted within said cleaning chamber and a device is provided to allow adjustment of said plate externally of said cleaning area.

5. A sugar can harvester comprising choping means to chop cane crop into billets, a cleaning chamber to separate the chaff in said crop from said billets in said crop after said crop passes through said chopping means into said cleaning chamber, an energy absorbing plate operable to contact said crop and deflect it downwardly after said crop has passed through said chopping means, said plate being adjustable and hingedly mounted immediately adjacent said chopping means in said cleaning chamber, said adjustment being provided by a control located externally of said cleaning chamber so as to cause said plate to contact a greater or lesser amount of said crop.

* * * * *

UNITED STATES PATENT AND TRADEMARK OFFICE
CERTIFICATE OF CORRECTION

PATENT NO. : 4,677,813
DATED : July 7, 1987
INVENTOR(S) : STIFF et al

It is certified that error appears in the above-identified patent and that said Letters Patent is hereby corrected as shown below:

Title page:

In the Assignee Identification (Section 73) change "Canada" to -- Australia --.

In the Abstract, line 13, change "A" to -- An --.

In the Specification:

Column 1, line 49, change "olean" to -- clean --;

Column 2, line 40, change "ineffioient" to -- inefficient --;

Column 7, line 42, change "olose" to -- close --.

In the Claims:

Claim 1, line 3 (Column 8, line 12), change "aid" to -- said --.

Signed and Sealed this

Eighth Day of March, 1988

Attest:

DONALD J. QUIGG

*Attesting Officer*  *Commissioner of Patents and Trademarks*